(12) United States Patent
Barnett

(10) Patent No.: US 11,565,684 B2
(45) Date of Patent: Jan. 31, 2023

(54) MASTER CYLINDER ASSEMBLY WITH SEPARATOR

(71) Applicant: Robert L. Barnett, Santa Ana, CA (US)

(72) Inventor: Robert L. Barnett, Santa Ana, CA (US)

( * ) Notice: Subject to any disclaimer, the term of this patent is extended or adjusted under 35 U.S.C. 154(b) by 3 days.

(21) Appl. No.: 17/444,369

(22) Filed: Aug. 3, 2021

(65) Prior Publication Data

US 2022/0032895 A1 Feb. 3, 2022

Related U.S. Application Data

(60) Provisional application No. 63/060,427, filed on Aug. 3, 2020.

(51) Int. Cl.
*B60T 17/22* (2006.01)
*B60T 11/26* (2006.01)
*B60T 11/22* (2006.01)

(52) U.S. Cl.
CPC .............. *B60T 17/222* (2013.01); *B60T 11/22* (2013.01); *B60T 11/26* (2013.01)

(58) Field of Classification Search
CPC ........ B60T 11/30; B60T 17/222; B60T 17/22; B60T 11/22; B60T 17/06
See application file for complete search history.

(56) References Cited

FOREIGN PATENT DOCUMENTS

WO  WO-2018139595 A1 *  8/2018  .............. B60T 11/26
WO  WO-2019076642 A1 *  4/2019

OTHER PUBLICATIONS

Translation of WO-2019076642-A1 (attached to Foreign Ref) (Year: 2022).*
Translation of WO-2018139595-A1 (attached to Foreign Ref) (Year: 2022).*

* cited by examiner

*Primary Examiner* — Thomas E Lazo
*Assistant Examiner* — Daniel S Collins
(74) *Attorney, Agent, or Firm* — Knobbe, Martens, Olson & Bear LLP

(57) ABSTRACT

Master cylinder assemblies, particularly for operation of the brake or clutch of motorcycles or other ATVs, are susceptible to a reduction in pressure due to the introduction of unwanted gases within the hydraulic lines. As a result, the brake or clutch system may not operate as designed. The present disclosure describes master cylinder assemblies that include one or more fluid separators, with a separator at least at the compensating port of the fluid reservoir to inhibit or prevent air or other gases from entering the piston channel through the compensating or inlet ports.

20 Claims, 3 Drawing Sheets

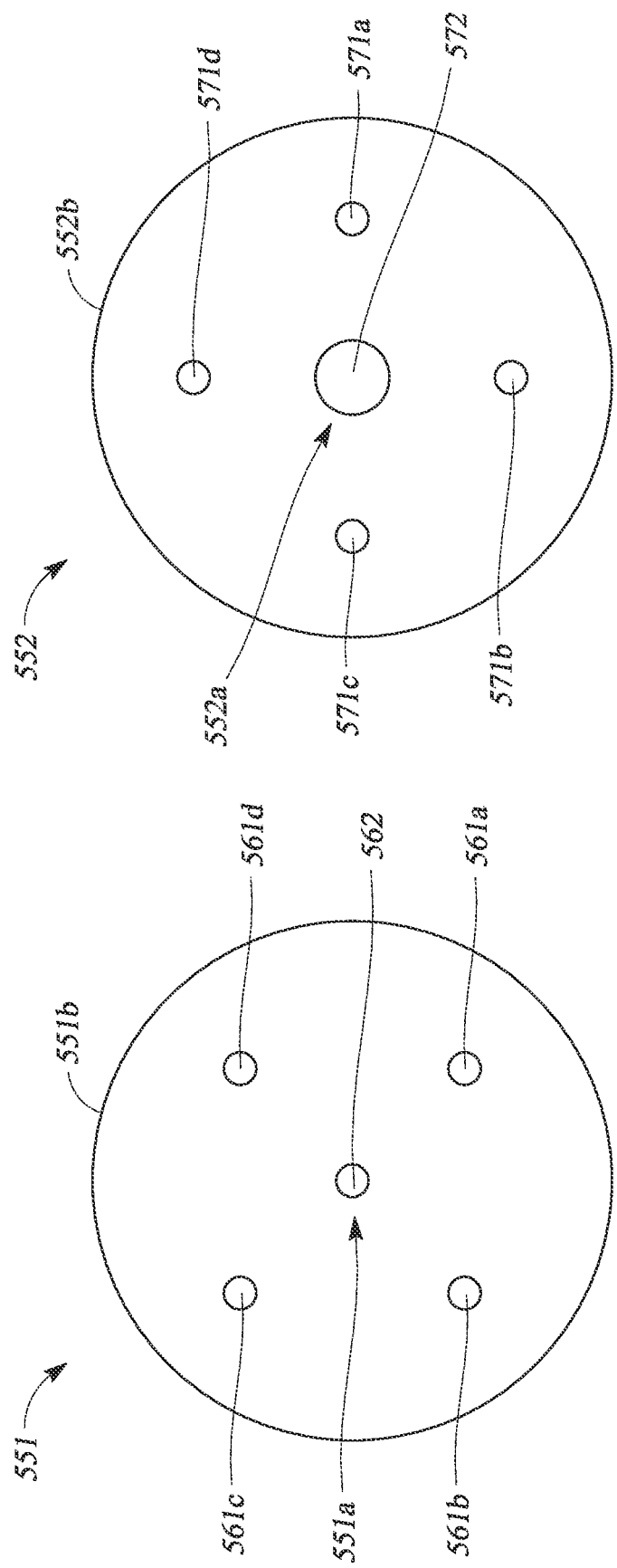

MASTER CYLINDER ASSEMBLY WITH SEPARATOR

RELATED APPLICATIONS

Any and all applications for which a foreign or domestic priority claim is identified in the Application Data Sheet as filed with the present application are hereby incorporated by reference herein and made a part of the present disclosure.

BACKGROUND

Field

The present disclosure generally relates to master cylinder assemblies for hydraulic systems, such as those used for brakes or clutches in motorcycles, dirt bikes, or ATVs.

Related Art

Hydraulic systems generally use an incompressible fluid to generate leverage and perform work (e.g., squeezing a brake pad or operating a clutch). In a hydraulic brake system, for example, when a brake lever is squeezed by a force, a push rod moves a piston in a master cylinder. Movement of the piston traps fluid within the master cylinder and increases the pressure within one or more hydraulic lines. The force is transmitted through the fluid in the hydraulic lines and acts on one or more caliper pistons to engage the brake pads against the rotors. Release of the brake lever allows the push rod and the piston in the master cylinder assembly to return back into its rest position, which may be assisted by a spring. The return action relieves the pressure within the hydraulic lines and allows the caliper pistons to disengage from the brake pads and thereby releasing the rotors. Similarly, in a hydraulic clutch system, for example, when a clutch lever is squeezed, a push rod moves a piston in a master cylinder. Movement of the piston increases pressure within one or more hydraulic lines typically to disengage the clutch. Release of the clutch lever allows the push rod and piston to return to the rest position to allow the clutch to reengage.

BRIEF DESCRIPTION OF THE DRAWINGS

FIG. 3 shows a top view of an upper dome of a separator for use within the master cylinder assembly.

FIG. 4 shows a top view of a lower dome of a separator for use within the master cylinder assembly.

DETAILED DESCRIPTION

Figure 1:
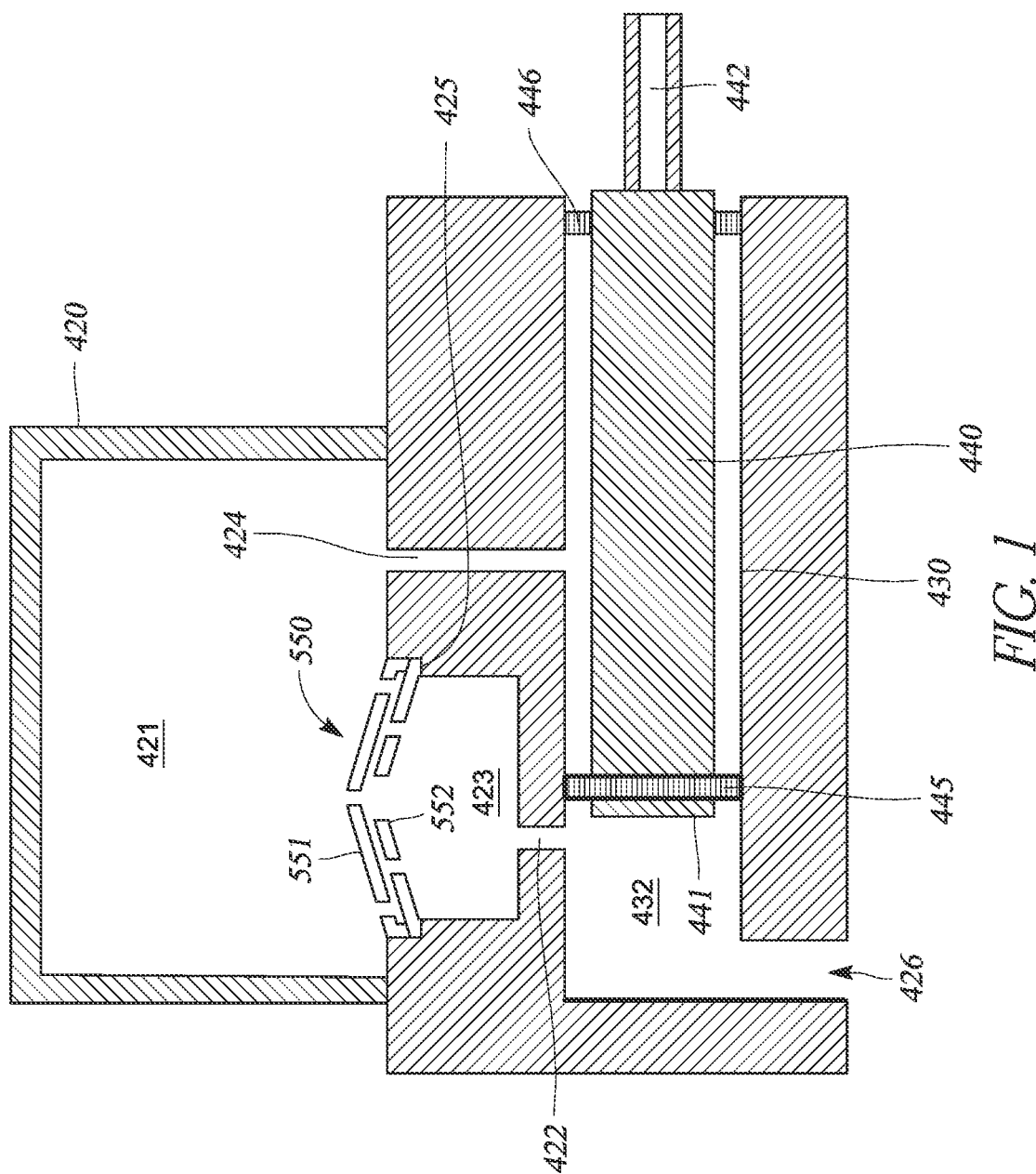
FIG. 1 is a cross-sectional view of a master cylinder assembly including a separator within a recess over the compensating port.

With reference to FIG. 1, a master cylinder assembly 100 can include a cylinder 430 attached with a reservoir 420 adapted to contain an incompressible fluid 421, such as a brake or clutch fluid. The master cylinder assembly 100 can be a portion of, or configured for use with, a vehicle (e.g., motorcycle, ATV or UTV) brake system, clutch system or other hydraulic system. The cylinder 430 can include a channel 432 with a longitudinal axis. A piston 440 can be disposed within the channel 432 and generally aligned with the longitudinal axis. The channel 432 can be substantially cylindrical and surround a piston 440. The channel 432 can include a small clearance between the cylinder 430 and the piston 440. The piston 440 can be coupled with a push rod 442 (e.g., by a flexible joint that allows the push rod 442 to articulate relative to the piston 440). The piston 440 can include a shaft seal 446. The shaft seal 446 can block the fluid 421 from flowing past the piston 440 and escaping from the channel 432.

The piston 440 can include a seal 445 between an outer surface of the piston 440 and an inner surface of the channel 432. The movement of the piston 440 towards a front end of the channel 432 (left in the orientation of FIG. 1) decreases a volume of the channel 432 in front of the piston 440 and increases the pressure of the fluid 421 in an outlet port 426 and downstream in one or more hydraulic lines (not shown). The seal 445 can substantially inhibit or prevent the backflow of the fluid 421 past the seal 445 to the back side of the seal 445. The increase in pressure in the hydraulic lines can activate one or more hydraulic components (e.g., pistons for brake or clutch systems). Movement of the piston 440 away from the front end of the channel 432 decreases the pressure of the fluid 421 in the outlet port 426 and the downstream hydraulic lines. The decrease in pressure can release or de-activate the hydraulic components in the system. As used herein, activate can mean move from one position to another, such as from a relaxed or default position to an active position. Such movement can engage the controlled component (such as in a brake system) or disengage the controlled component (such as in a clutch system) depending on the relaxed or default position of the controlled component.

The master cylinder 100 can include a return spring (not shown). The return spring can be aligned co-axially within the channel 432. The return spring can be disposed between a front end 441 of the piston 440 and the front end of the cylinder 430. The return spring can be compressed when the push rod 442 and piston 440 are moved towards the front end 436 of the cylinder 430 (e.g., by an external force). The return spring can supply a restoring force to move or assist in movement of the piston 440 such that the piston 440 moves away from the front end 436 of the cylinder 430. The piston 440 can return to a neutral position (e.g., when the external force is removed).

The master cylinder assembly 100 can include a compensating (bypass or shut-off) port 422 and/or an intake (free bleed) port 424. The reservoir 420 can have fluid communication with the channel 432 through either or both of the compensating port 422 or intake port 424. The fluid 421 can pass between the channel 432 and the reservoir 420 through the compensating port 422 and/or the intake port 424.

The compensating port 422 regulates the amount of the fluid 421 in the hydraulic lines by allowing fluid 421 into or out of the hydraulic lines and into the reservoir 420. The movement of fluid can be due to expansion or contraction of the fluid 421 based on temperature variations, pad/plate wear, or other causes. When the piston 440 moves forward, the seal 445 can pass the compensating port 422 (moving left as shown in FIG. 1). Once the seal 445 is past the compensating port 422 pressure within the fluid 421 can build up within the outlet port 426 and hydraulic lines without escaping through the compensating port 422. As the piston 440 moves rearwardly, the seal 445 can pass the compensating port 422 in the opposite direction (moving right as shown in FIG. 1). Once the seal 445 is past the compensating port 422, the volume and/or pressure within the fluid 421 can be adjusted. That is, excess fluid can pass through the compensating port 422 into the reservoir 420. Alternatively, any vacuum that builds up in the front of the piston 440 can be compensated for by fluid 421 passing into the channel 432 through the compensating port 422. Additionally, built-up gases (e.g., air bubbles) can escape the hydraulic lines through the compensating port 422. The intake port 424 can allow fluid to pass into and out of the space within the channel 432 and behind the piston 440 and thereby inhibit or prevent the buildup of a vacuum behind the piston 440.

As described above, the compensating port 422 and the intake port 424 can allow venting of gases trapped within the fluid 421. Gases can build up in the fluid 421 contained in the hydraulic lines due to leaks, boiling of moisture contained in the fluid, or other reasons. The built-up gases within the hydraulic lines causes latency and lack of responsiveness due to compressibility of the gases. Allowing the gases to vent through the compensating port 422 and/or the intake port 424 into the reservoir 420 can increase the responsiveness of the overall system.

A motorcycle or ATV can experience vibrations that increase the likelihood of gases (e.g., air bubbles or foam) entering the compensating port 422 and/or the intake port 424. For example, the engine of a motorcycle or ATV can create significant vibrations that reverberate throughout the motorcycle/ATV, including the master cylinder assembly 200. The vibrations can be severe enough to require an air separator between the reservoir 420 and channel 432 or at least make an air separator beneficial to the operation of the system. In addition, under at least some circumstances (such as high-level competitive events), the vehicle traverses irregular terrain at high speeds, which can result in rapid changes in direction in order to stay on course. This too adds to the problem of keeping air/foam isolated from the pressure side of the system. As discussed above, gases passing through the compensation port 422 and into the pressure side of the system is especially problematic. When the piston 440 is cycled quickly, the problem of unwanted gases within the hydraulic fluid 421 in the reservoir 420 making their way back into the channel 432 or the hydraulic lines through the compensating port 422 and/or the intake port 424 can be exacerbated. Accordingly, air separators or baffles are often used to inhibit or prevent the flow of gases in the fluid 421 within the reservoir 420 back into the channel 432 or the downstream hydraulic lines. In prior art systems, a single air separator covers both the compensating port 422 and the intake port 424.

The present inventor has discovered that covering both ports 422, 424 with a single air separators appears to be the cause of reduced system performance under some conditions, such as high level competitive events or other high speed operation of the vehicle. It is possible that air bubbles travel from one side of the piston to the other underneath the single separator. Therefore, the present inventor contemplates that a single air separator should correspond only with a single port. Preferably, a single air separator is associated with (e.g., covers) the compensating port 422 as this port leads directly to the pressure side of the system. However, other possibilities exist, such as associating a single air separator with only the intake port 424 or providing a separate air separator for each of the compensating port 422 and the intake port 424.

FIG. 1 shows the master cylinder assembly 200 can include a separator 550 and an open intake port 424. That is, the separator 550 does not cover the intake port 424 and no additional separator is provided over the intake port 424. The separator 550 can be aligned with the compensating port 422. The separator 550 can be located within the reservoir 420 and the fluid 421. The separator 550 can include one or more baffles through which the fluid 421 must flow to pass between the channel 432 and the reservoir 420 through the compensating port 422. The baffles can slow the flow of the fluid 421 therethrough and/or create an indirect flow path to facilitate the trapping of air bubbles that could otherwise pass into the pressure side of the system. The separator 550 can function to hinder the flow of air or other gases from entering the channel 432 through the port 422.

The separator 550 can include a lower end and an upper end. The lower end can be coupled with an opening of the compensating port 422. The upper end can extend into the reservoir 420. In on embodiment, an outer wall can extend between the lower end and the upper end. The separator 550 can comprise one or more baffles therein. The baffles can be spaced between the lower end and the upper end. One or more corresponding apertures can be located in each of the baffles, creating a through path from the lower end to the upper end. Fluid can flow from the lower end to the upper end by passing through the apertures and the baffles and in the reverse direction.

In one alternative embodiment of a master cylinder a second separator can have the same or similar structure as the separator 550 and be mounted on the intake port 424. In another an alternative embodiment of a master cylinder including the separator 550 aligned with the intake port 424 and no separator associated with the compensating port 422.

Returning to FIG. 1, the recess 423 can be aligned with the compensating port 422. The recess 423 can be located within a lower wall of the reservoir 420. The recess 423 can be sized to receive a separator 550. The recess 423 can be circular in top view or have any other suitable profile. The recesses 423 can include an inner shelf 425. The inner shelf 425 can extend around the perimeter of the recess 423. The inner shelf 425 can have a depth corresponding to a thickness of the separator 550. The separator 550 can be fully or partially recessed within the recess 423. The recess 423 can have a width (e.g., diameter) corresponding to a width of the corresponding separator 550 such that the separator 550 can be securely fit within the recesses 423 (e.g., a compression fit that prevent fluid flow between the separator and the reservoir wall). The separator 550 can be removable from the reservoir (e.g., recess) and/or replaceable with the same or different separator. This can facilitate replacement and/or cleaning of the separators to ensure long-term functionality of the master cylinder assembly.

In the illustrated arrangement, the intake port 424 does not include any separator or other baffle. The intake port 424 can be linear between the reservoir 420 and the cylinder 430 or along a vertical direction in the illustrated orientation of FIG. 6. The intake port 424 can have a uniform cross-section from upper end to lower end. This can facilitate free movement of fluid between the reservoir 420 and the portion of the cylinder 430 behind the seal 445 of the piston 440 to compensate for movement of the piston 440 and/or bleeding of gases that may be trapped within the fluid 421.

Figure 2:
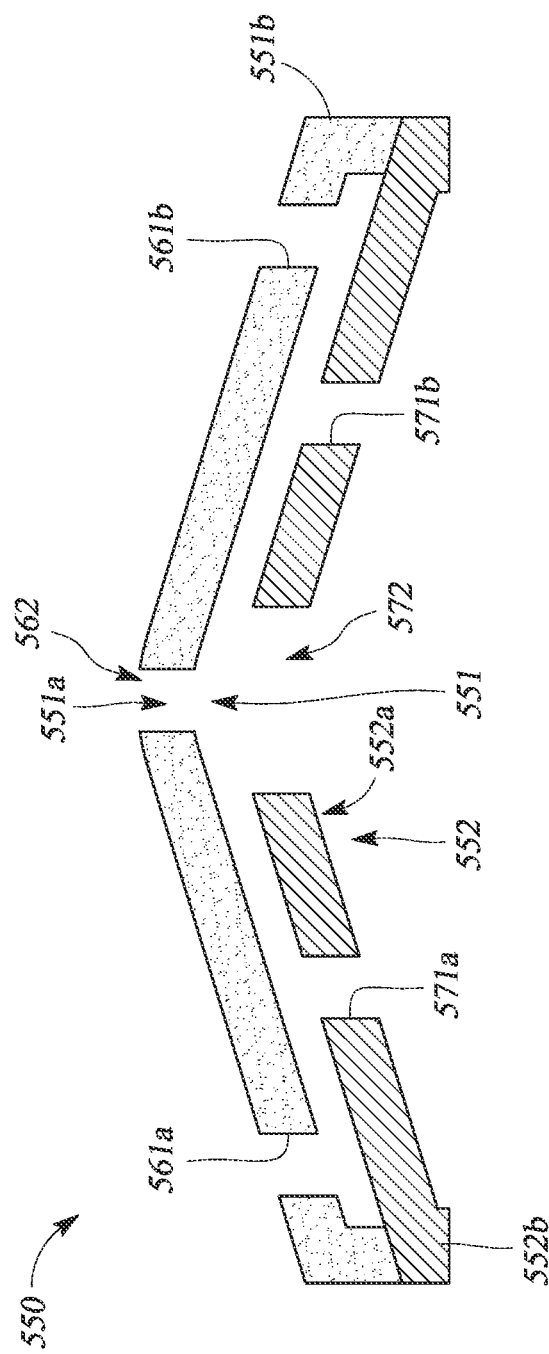
FIG. 2 shows cross-section view of a schematic separator for use within the master cylinder assembly.

Details of the separator 550 are further shown in FIGS. 2-4. The separator 550 can comprises an upper dome 551 and a lower dome 552. Each of the upper and lower domes 551, 552 can comprise a unitary material, such a foam or plastic material (e.g., a hard plastic relative to the foam). In one implementation, the upper dome 551 can comprise a foam material and the lower dome 552 can comprise a plastic material. The upper dome 551 can include a center 551$a$ and an outer perimeter 551$b$. The upper dome 551 can be conical or domed therebetween. The perimeter 551$b$ can be circular (as illustrated) or have another shape. The upper dome 551 can be cupped to include a concave side (e.g., a lower side, as used) and a convex side (e.g., an upper side, as used). The upper dome 551 can optionally include a central aperture 562. The central aperture 562 can be at the center 551a. The upper dome 551 can include a plurality of spaced apertures, such as the apertures 561a-d. The apertures 561a-d can be spaced at intervals between the center 551a and the perimeter 551b. Optionally, each of the aperture 561a-d can have the same diameter and extend all the way through the upper dome 551.

The lower dome 552 can include a center 552a and an outer perimeter 552b. The lower dome 552 can be conical or domed therebetween. The perimeter 552b can be circular (as illustrated) or have another shape. The lower dome 552 can be cupped to include a concave side (e.g., a lower side, as used) and a convex side (e.g., an upper side, as used). The lower dome 552 can optionally include a central aperture 572. The central aperture 572 can be at the center 552a. The lower dome 552 can include a plurality of spaced apertures, such as the apertures 571a-d. The apertures 571a-d can be spaced at intervals between the center 552a and the perimeter 552b. Optionally, each of the aperture 571a-d can have the same diameter and extend all the way through the lower dome 552.

The upper dome 551 can be formed with or assembled with the lower dome 552. The outer perimeters 551b can be coupled with the outer perimeter 552b. The attachment can be accomplished by any mechanical, chemical or other suitable means (e.g., adhesive, heat welding, mechanical fasteners, unitary construction, etc.). The convex side of the lower dome 552 can be received within (e.g., past the perimeter 551b) a concave side of the upper dome 551. A spacing between the convex side of the lower dome 552 and the concave side of the upper dome 551 can be greater than 0.0625 inches and less than 0.25 inches. The spacing can be uniform from the central portions to the perimeter (e.g., the convex side of the lower dome 552 can be parallel with the concave side of the upper dome 551).

The central aperture 562 can align with the central aperture 572 with the upper and lower domes assembled together. The central aperture 562 can have a smaller diameter than the central aperture 572. The apertures 561a-d can be offset from each of the apertures 571a-d (e.g., either radially or angularly). In one example, the apertures 561a-d are angularly offset 45° from the apertures 571a-d. In one example, the apertures 561a-d are offset in a radial direction from the apertures 571a-d. In another example, the apertures 561a-d are angularly offset 45° and offset in a radial direction from the apertures 571a-d. This can facilitate the slowing of fluid flow and/or hindering backflow of air or other gases into the channel 432 through the compensating port 422.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of master cylinder assemblies have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of master cylinder assemblies and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A master cylinder assembly comprising a:
   a reservoir containing a fluid;
   a piston coupled with a pushrod and disposed within a channel, the piston movable within the channel;
   an outlet port coupled with a hydraulic line in fluid communication with a front end of the channel;
   an intake port and a compensating port providing fluid communication between the reservoir and the channel, the compensating port positioned between the intake port and the front end of the channel;
   a seal coupled with the piston, the piston movable towards the front end of the channel such that the seal moves past the compensating port to increases a pressure of the fluid within the outlet port and downstream in the hydraulic line;
   a separator coupled within a circular recess surrounding the compensating port and supported on a shelf therein, the separator configured to hinder backflow of air or other gases from re-entering the channel through the compensating port;
   wherein the separator includes:
      an upper dome comprising a foam material and having an outer perimeter;
      an lower dome comprising a hard plastic material and having an outer perimeter;
      wherein the upper dome attaches with the lower dome at the respective outer perimeters and a convex side of the lower dome is received within a concave side of the upper dome, a spacing therebetween being between 0.0625 and 0.25 inches, and the convex side of the lower dome is parallel with the concave side of the upper dome;
      a plurality of first apertures in the upper dome;
      a plurality of second apertures in the lower dome;
      wherein the plurality of first apertures includes four apertures, the plurality of second apertures includes four apertures, each of the first apertures are angularly offset from each of the second apertures by 45°, and each of the first apertures are radially offset from each of the second apertures;
      a first central aperture in the upper dome;
      a second central aperture in the lower dome;
      wherein the first central aperture is aligned with the second central aperture, the second central aperture having a greater diameter than the first central aperture; and
      wherein the intake port has a uniform cross-section from an upper end within the reservoir to a lower end at the channel and extends linearly from the upper end to the lower end to facilitate free-bleeding of gases from the fluid within the channel.

2. A master cylinder assembly comprising a:
   a reservoir containing a fluid;
   a piston coupled with a pushrod and disposed within a channel, the piston movable within the channel;
   an outlet port coupled with a hydraulic line in fluid communication with a front end of the channel;

an intake port and a compensating port providing fluid communication between the reservoir and the channel, the compensating port positioned between the intake port and the front end of the channel;

a seal coupled with the piston, the piston movable towards the front end of the channel such that the seal moves past the compensating port to increases a pressure of the fluid within the outlet port and downstream in the hydraulic line;

a separator coupled within a recess surrounding the compensating port, the separator configured to hinder backflow of air or other gases from re-entering the channel through the compensating port;

wherein the separator includes:
an upper dome having an outer perimeter;
an lower dome having an outer perimeter;
wherein the upper dome attaches with the lower dome at the respective outer perimeters;
a plurality of first apertures in the upper dome;
a plurality of second apertures in the lower dome;
wherein each of the first apertures are misaligned with each of the second apertures.

3. The master cylinder assembly of claim 2, wherein the separator is coupled within the recess surrounding the compensating port and supported on a shelf therein.

4. The master cylinder assembly of claim 2, wherein a convex side of the lower dome is received within a concave side of the upper dome.

5. The master cylinder assembly of claim 2, wherein a convex side of the lower dome and a concave side of the upper dome are parallel.

6. The master cylinder assembly of claim 2, wherein a spacing between a convex side of the lower dome and a concave side of the upper dome is between 0.0625 and 0.25 inches.

7. The master cylinder assembly of claim 2, wherein the plurality of first apertures includes four apertures and the plurality of second apertures includes four apertures.

8. The master cylinder assembly of claim 2, wherein each of the first apertures are angularly offset from each of the second apertures.

9. The master cylinder assembly of claim 2, wherein each of the first apertures are angularly offset from each of the second apertures by 45°.

10. The master cylinder assembly of claim 2, wherein each of the first apertures are radially offset from each of the second apertures.

11. The master cylinder assembly of claim 2, wherein the separator includes a first central aperture in the upper dome, a second central aperture in the lower dome, and the first central aperture is aligned with the second central aperture, the second central aperture having a greater diameter than the first central aperture.

12. The master cylinder assembly of claim 2, wherein the intake port has a uniform cross-section from an upper end within the reservoir to a lower end at the channel and extends linearly from the upper end to the lower end to facilitate free-bleeding of gases from the fluid within the channel.

13. A master cylinder assembly comprising a:
a reservoir containing a fluid;
a piston coupled with a pushrod and disposed within a channel, the piston movable within the channel;
an outlet port coupled with a hydraulic line in fluid communication with the channel;
an intake port and a compensating port providing fluid communication between the reservoir and the channel;
wherein the compensating port is coupled with a separator including one or more baffles.

14. The assembly of claim 13, wherein the separator comprises a unitary plastic material.

15. The assembly of claim 13, wherein the separator is removable from within a recess in a wall of the reservoir.

16. The assembly of claim 13, wherein the separator includes a first end and a second end, the first end coupled with an opening of the compensating port and the second end extending into the reservoir.

17. The assembly of claim 16, wherein the separator includes an outer wall extending between the first end and the second end.

18. The assembly of claim 17, wherein the outer wall is a cylindrical wall.

19. The assembly of claim 17, wherein a plurality of baffles within the outer wall are spaced between the first end and the second end, each of the baffles including at least one aperture therethrough to define a through path for fluid communication between the first end and the second end.

20. The assembly of claim 19, wherein the apertures of each of the plurality of baffles are misaligned along the through path to hinder backflow of air or other gases from re-entering the channel.

* * * * *